United States Patent
Biskeborn et al.

(10) Patent No.: US 8,861,139 B2
(45) Date of Patent: Oct. 14, 2014

(54) MAGNETIC HEAD WITH PLANAR OUTRIGGER

(75) Inventors: Robert Glenn Biskeborn, Hollister, CA (US); Jason Liang, San Jose, CA (US); Calvin Shyhjong Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 1077 days.

(21) Appl. No.: 12/638,921

(22) Filed: Dec. 15, 2009

(65) Prior Publication Data

US 2010/0118435 A1    May 13, 2010

Related U.S. Application Data

(62) Division of application No. 11/231,365, filed on Aug. 26, 2005, now Pat. No. 7,660,072.

(51) Int. Cl.
| | |
|---|---|
| G11B 5/187 | (2006.01) |
| G11B 5/008 | (2006.01) |
| G11B 5/10 | (2006.01) |
| G11B 5/265 | (2006.01) |
| G11B 5/40 | (2006.01) |

(52) U.S. Cl.
CPC .............. *G11B 5/00826* (2013.01); *G11B 5/40* (2013.01); *G11B 5/10* (2013.01); *G11B 5/1871* (2013.01)
USPC ...................................... 360/130.21; 260/122

(58) Field of Classification Search
USPC .................. 360/122, 129, 121, 130.2, 130.21
See application file for complete search history.

(56) References Cited

U.S. PATENT DOCUMENTS

| | | | |
|---|---|---|---|
| 5,307,227 A * | 4/1994 | Okada et al. | 360/122 |
| 5,737,158 A | 4/1998 | Tanaka et al. | 360/130.21 |
| 5,905,613 A | 5/1999 | Biskeborn et al. | 29/603.12 |
| 6,122,147 A | 9/2000 | Fahimi et al. | 360/221 |
| 6,341,416 B1 * | 1/2002 | Biskeborn et al. | 29/603.12 |
| 6,700,733 B1 | 3/2004 | Biskeborn | 360/90 |
| 6,760,199 B2 * | 7/2004 | Biskeborn | 360/323 |
| 6,781,792 B2 | 8/2004 | Biskeborn | 360/129 |
| 6,937,435 B2 * | 8/2005 | Saliba | 360/122 |
| 6,972,931 B2 | 12/2005 | Rudi et al. | 360/241 |
| 7,154,691 B2 | 12/2006 | Girvin et al. | 360/61 |
| 7,486,479 B2 | 2/2009 | Nakao et al. | 360/130.21 |
| 7,660,072 B2 | 2/2010 | Biskeborn et al. | 360/122 |
| 2001/0055180 A1 | 12/2001 | Saliba | 360/1.22 |
| 2003/0039069 A1 * | 2/2003 | Biskeborn | 360/129 |
| 2003/0179499 A1 | 9/2003 | Shinjo et al. | 360/129 |
| 2003/0235011 A1 * | 12/2003 | Rubas et al. | 360/261.1 |
| 2004/0047076 A1 | 3/2004 | Rudi et al. | 360/241 |

OTHER PUBLICATIONS

Office Action Summary from U.S. Appl. No. 11/213,365 mailed on Aug. 24, 2007.

(Continued)

*Primary Examiner* — Julie Anne Watko
(74) *Attorney, Agent, or Firm* — Zilka-Kotab, PC (57) ABSTRACT

A magnetic head according to one embodiment includes a substrate having a tape bearing surface; a plurality of elements coupled to the substrate and positioned towards the first tape bearing surface, the elements being selected from a group consisting of readers, writers, and combinations thereof; and an outrigger held in a fixed position relative to the substrate, the outrigger having a tape bearing surface; wherein the outrigger tape bearing surface and the substrate tape bearing surface lie along planes, the planes being offset from one another.

2 Claims, 10 Drawing Sheets

(56) References Cited

OTHER PUBLICATIONS

Office Action Summary from U.S. Appl. No. 11/213,365 mailed on Jan. 28, 2008.
Office Action Summary from U.S. Appl. No. 11/213,365: mailed on Jul. 9, 2008.
Office Action Summary from U.S. Appl. No. 11/213,365 mailed on Nov. 5, 2008.
Final Office Action Summary from U.S. Appl. No. 11/213,365 mailed on May 14, 2009.
Notice of Allowance from U.S. Appl. No. 11/213,365 mailed on Sep. 30, 2009.

* cited by examiner

MAGNETIC HEAD WITH PLANAR OUTRIGGER

RELATED APPLICATIONS

This application is a divisional of U.S. patent application Ser. No. 11/213,365 to Biskeborn et al., filed Aug. 26, 2005 now U.S. Pat. No. 7,660,072, which is herein incorporated by reference.

This application is related to U.S. patent application Ser. No. 11/213,548 entitled "MULTI-FORMAT MAGNETIC HEAD" to Biskeborn et al., filed Aug. 26, 2005, and U.S. patent application Ser. No. 11/213,366 entitled "FLAT PROFILE MAGNETIC HEAD" to Biskeborn, filed Aug. 26, 2005.

FIELD OF THE INVENTION

The present invention relates to magnetic head structures, and more particularly, this invention relates to a magnetic head structure having a planar outrigger for establishing a tape wrap angle.

BACKGROUND OF THE INVENTION

Figure 1:
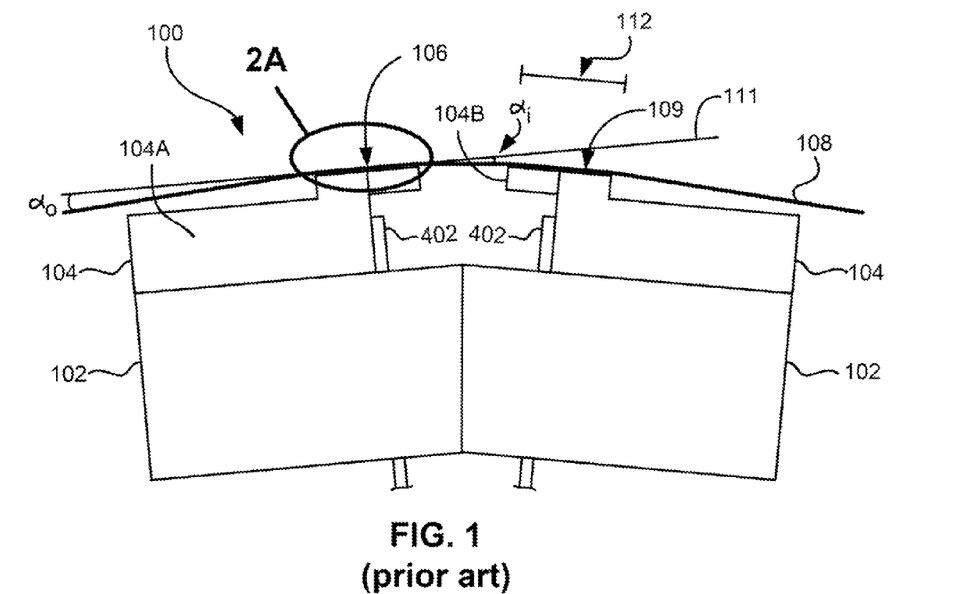
FIG. 1 illustrates a traditional flat-lapped magnetic tape head, in accordance with the prior art.

FIG. 1 illustrates a traditional flat-lapped bi-directional, two-module magnetic tape head 100, in accordance with the prior art. As shown, the head includes a pair of bases 102, each equipped with a module 104. The bases are typically "U-beams" that are adhesively coupled together. Each module 104 includes a substrate 104A and a closure 104B with readers and writers 106 situated therebetween. In use, a tape 108 is moved over the modules 104 along a tape bearing surface 109 in the manner shown for reading and writing data on the tape 108 using the readers and writers 106. Conventionally, a partial vacuum is formed between the tape 108 and the tape bearing surface 109 for maintaining the tape 108 in close proximity with the readers and writers 106.

Two common parameters are associated with heads of such design. One parameter includes the tape wrap angles $\alpha_i$, $\alpha_o$ defined between the tape 108 and a plane 111 in which the upper surface of the tape bearing surface 109 resides. It should be noted that the tape wrap angles $\alpha_i$, $\alpha_o$ includes an inner wrap angle $\alpha_i$ which is often similar in degree to an external, or outer, wrap angle $\alpha_o$. The tape bearing surfaces 109 of the modules 104 are set at a predetermined angle from each other such that the desired inner wrap angle $\alpha_i$ is achieved at the facing edges. Moreover, a tape bearing surface length 112 is defined as the distance (in the direction of tape travel) between edges of the tape bearing surface 109. The wrap angles $\alpha_i$, $\alpha_o$ and tape bearing surface length 112 are often adjusted to deal with various operational aspects of heads such as that of FIG. 1, in a manner that will soon become apparent.

Figure 2A:
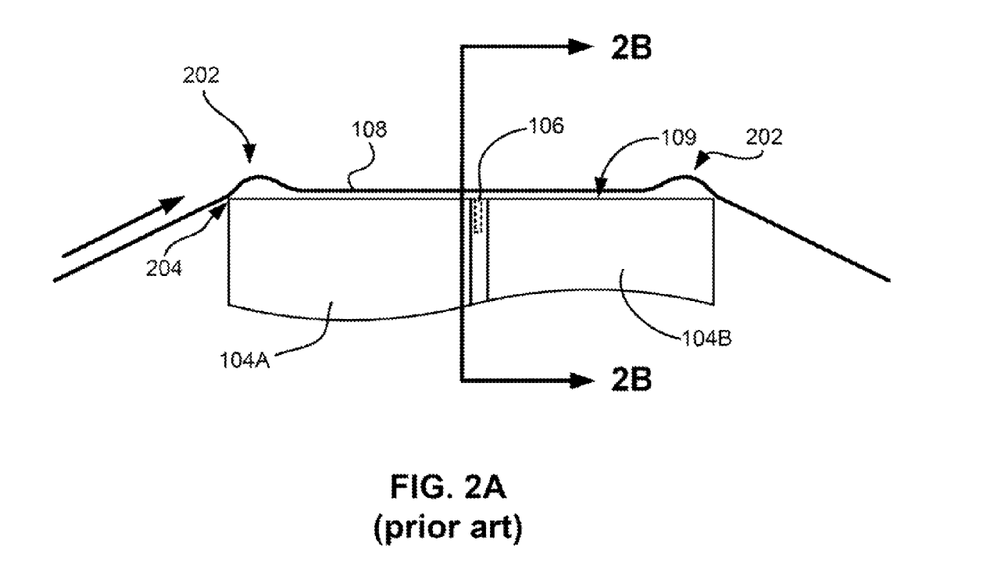
FIG. 2A is an enlarged view of Circle 2A of FIG. 1, showing a first and second known effect associated with the use of the head of FIG. 1.

During use of the head of FIG. 1, various effects traditionally occur. FIG. 2A is an enlarged view of the area encircled in FIG. 1. FIG. 2A illustrates a first known effect associated with the use of the head 100 of FIG. 1. When the tape 108 moves across the head as shown, air is skived from below the tape 108 by a skiving edge 204 of the substrate 104A, and instead of the tape 108 lifting from the tape bearing surface 109 of the module (as intuitively it should), the reduced air pressure in the area between the tape 108 and the tape bearing surface 109 allows atmospheric pressure to urge the tape towards the tape bearing surface 109.

To obtain this desirable effect, the wrap angle $\alpha_o$ is carefully selected. An illustrative wrap angle is about 0.9°±0.2.

Note, however, that any wrap angle greater than 0° results in tents 202 being formed in the tape 108 on opposite edges of the tape bearing surface 109. This effect is a function of tape stiffness and tension. For given geometrical wrap angles for example, stiffer tapes will have larger tents 202.

If the wrap angle $\alpha_i$, $\alpha_o$ is too high, the tape 108 will tend to lift from the tape bearing surface 109 in spite of the vacuum. The larger the wrap angle, the larger the tent 202, and consequently the more air is allowed to enter between the tape bearing surface 109 and tape 108. Ultimately, the forces (atmospheric pressure) urging the tape 108 towards the tape bearing surface 109 are overcome and the tape 108 becomes detached from the tape bearing surface 109.

Figure 2B:
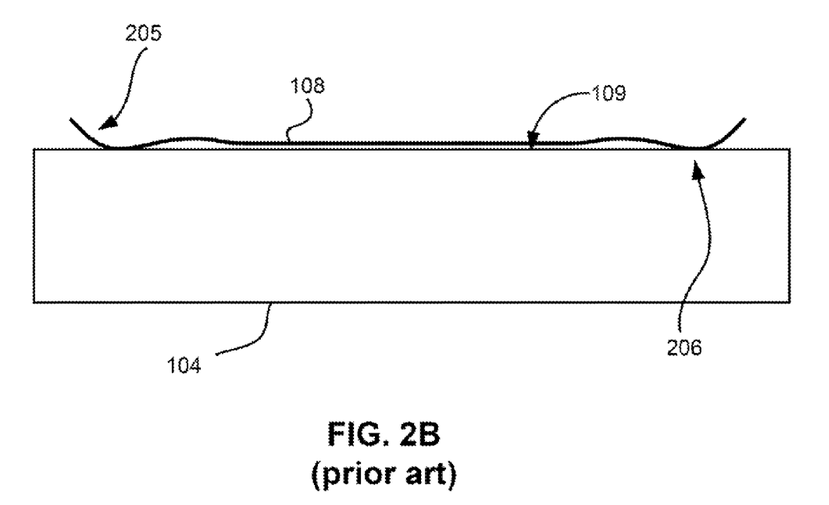
FIG. 2B is a cross-sectional view taken along Line 2B of FIG. 2A, showing a third known effect associated with the use of the head of FIG. 1.

If the wrap angle $\alpha_i$, $\alpha_o$ is too small, the tape tends to exhibit tape lifting 205, or curling, along the side edge of the tape bearing surface 109 as a result of air leaking in at the edges and tape mechanical effects. This effect is shown in FIG. 2B. Particularly, the edges of the tape curl away from the tape bearing surface 109, resulting in edge loss or increased spacing between the edges of the tape and the tape bearing surface 109. This is undesirable, as data cannot reliably be written to the edges of a tape in a system subject to edge loss.

Additionally, the tape lifting 205 results in additional stress at points 206 which, in turn, may cause additional wear. Further augmenting such tape lifting 205 is the fact that the tape 108 naturally has upturned edges due to widespread use of technology applied in the video tape arts.

The external wrap angles $\alpha_o$ are typically set in the drive, such as by rollers. The offset axis creates an orbital arc of rotation, allowing precise alignment of the wrap angle $\alpha_o$. However, situations arise where rollers may not be the most desirable choice to set the external wrap angles $\alpha_o$. For example, rollers require extra headroom in a drive, particularly where they are adjustable. Additionally, rollers, particularly adjustable roller systems, may be more expensive to install in the drive. A further drawback of this approach is mechanical alignment cannot be completed independent of signal read readiness.

One proposed solution, which is less expensive than implementing adjustable rollers, is to precisely install fixed rollers in the drive, the mounting of the rollers being fixedly set to provide about the desired wrap angle. (Some implementations further require adjusting the head during drive build to obtain the desired wrap angles.) However, with normal machining tolerances, the resultant wrap angle can vary by as much as ±0.5°. This is well outside the tolerances required for reliable reading and writing. For instance, using the example of a 0.9° ideal wrap angle, at the low end, the wrap angle would be 0.4°. Such a low wrap angle will result in edge loss. At the high end, the wrap angle would be 1.4°, which results in the tape lifting from the tape bearing surface.

There is accordingly a clearly-felt need in the art for a tape head assembly in which the critical wrap angles are fixed on the head itself, or fixed relative to the head itself. These unresolved problems and deficiencies are clearly felt in the art and are solved by this invention in the manner described below.

SUMMARY OF THE INVENTION

A magnetic head in one embodiment includes a substrate having a first tape bearing surface and a second (outrigger) tape bearing surface where the first and second tape bearing surfaces are separated by a slot. A plurality of elements (readers and/or writers) are coupled to the substrate and positioned towards the first tape bearing surface. The first and second tape bearing surfaces lie along substantially parallel planes, the planes being offset from one another. The second tape bearing surface induces a small spacing between a tape passing thereover and its tape bearing surface. The second tape bearing surface is positioned below the plane of the first tape bearing surface and the trailing edge of the second tape bearing surface is positioned at a prescribed distance from the leading edge of the first tape bearing surface, thereby creating the proper wrap angle of the tape relative to the first tape bearing surface.

Preferably, the plane of the second tape bearing surface is positioned below the plane of the first tape bearing surface, for example in a range of about 0.004 to about 0.014 mm below the plane of the first tape bearing surface.

A slot may be defined between the first and second tape bearing surfaces. The width of the slot between the surfaces is, for example, in a range of about 0.3 to about 1.0 mm.

Again, a first wrap angle is defined between the plane of the first tape bearing surface and a tape traveling from the second tape bearing surface to the first tape bearing surface, the first wrap angle being determined by a position of the second tape bearing surface relative to the first tape bearing surface. An illustrative first wrap angle is in a range of about 0.7° to about 1.1°.

A second wrap angle may also be defined between the plane of the second tape bearing surface and a tape traveling towards the second tape bearing surface. The second wrap angle is less critical, and may be, for example, greater than about 0.1° and less than about 2°.

One or more additional elements (readers and/or writers) may optionally be coupled to the module towards the second tape bearing surface.

The head may include a pair of modules coupled together. In such an embodiment, the second module may include a second substrate having a third tape bearing surface and a fourth tape bearing surface, and a plurality of elements coupled to the substrate and positioned towards the first tape bearing surface, wherein the third and fourth tape bearing surfaces lie along substantially parallel planes, the planes of the third and fourth tape bearing surfaces being offset from one another. Preferably, the planes of the first and third tape bearing surfaces are angled relative to one another for setting internal wrap angles of the tape with respect to the first and third tape bearing surfaces. The internal wrap angels may be similar to the first wrap angle described above.

In another embodiment, a magnetic head includes a substrate having a tape bearing surface, and a plurality of elements coupled to the substrate and positioned towards the tape bearing surface. An outrigger is held in a fixed position relative to the substrate, the outrigger also having a tape bearing surface lying along a plane that is offset from the substrate tape bearing surface. Again, the two tape bearing surfaces are separated by a gap or slot.

The outrigger may or may not be integral to the substrate. For example, the outrigger can be adhesively coupled to the substrate. In another embodiment, the outrigger is not coupled directly to the substrate. In a further embodiment, the outrigger tape bearing surface is parallel to a tape oriented at a desired wrap angle relative to the substrate tape bearing surface. In yet another embodiment, the outrigger tape bearing surface is angled from the substrate tape bearing surface by greater than a desired wrap angle of a tape relative to the substrate tape bearing surface.

In yet another embodiment, the second tape bearing surface is offset as above, but no slot or gap is formed between the first and second tape bearing surfaces. In this embodiment, the height difference between the planes is smaller and may be, e.g., about 0.002 to about 0.004 mm.

A tape drive system includes a head as recited above, a drive mechanism for passing a magnetic recording tape over the head, and a controller in communication with the head. The system may further include an outer tape guide for setting a wrap angle of the tape relative to the second (outrigger) tape bearing surface.

Methods for forming such heads are also presented. One illustrative method for forming a head includes forming elements on a substrate, the elements being selected from a group consisting of readers, writers, and combinations thereof. The substrate is cut into rows, each row having a first portion and a second portion. A slot is formed in each row between the first portion and the second portion, and a height of the second portion of the row is reduced. The row is cut into individual modules. The modules may then be coupled together to form a head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

Prior Art

BEST MODE FOR CARRYING OUT THE INVENTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each and any of the various possible combinations and permutations.

In the drawings, like and equivalent elements are numbered the same throughout the various figures.

The embodiments described below disclose a new head design that tolerates a wider range of initial tape wrap angles in a drive without sacrificing drive performance. This is accomplished by equipping the head with a novel type of outriggers, as explained below. The outriggers control the critical wrap angles within the head, and at the same time prevent the 'external' variations due to head positioning or external guide positioning errors from affecting the critical wrap angles, thus allowing a wider variation in drive-level wrap. This invention enables purely mechanical or datum-based positioning of a head in a drive.

Figure 3:
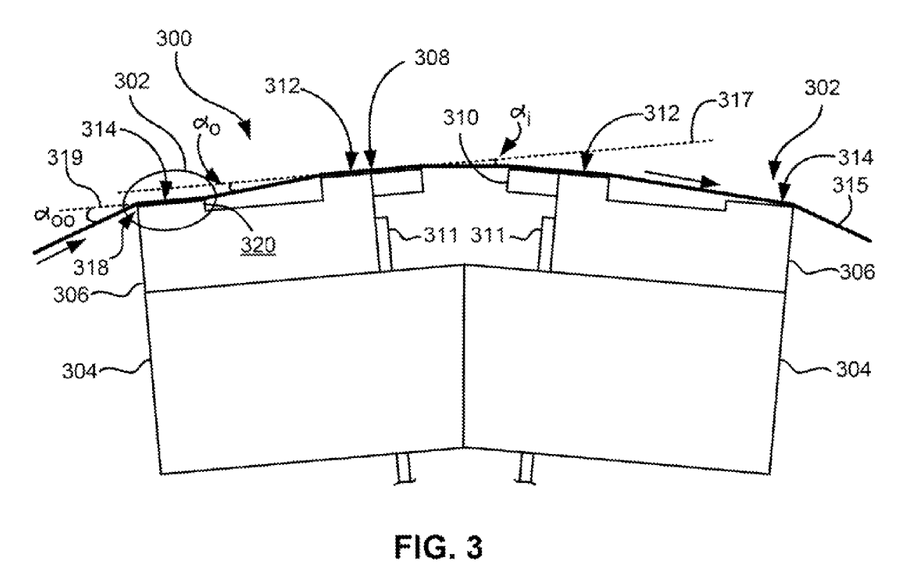
FIG. 3 is a side view of a magnetic tape head with integral outriggers according to one embodiment.

FIG. 3 illustrates an embodiment of a flat profile tape head 300 having integral outriggers 302. As shown the head includes opposing modules 304, each module 304 having a substrate 306, elements (readers and/or writers) 308, and a closure 310. The modules 304 are coupled together such that the tape bearing surfaces 312 of the modules 304 are offset in such a way that internal wrap angles $\alpha_i$ are defined between the modules 304. Cables 311 or other suitable wiring connect the elements to a controller, and read and write electronics.

Outriggers 302 are formed on each module 304. The outriggers 302 control the outer wrap angle $\alpha_o$ of the tape 315 relative to the tape bearing surfaces 312 adjacent the elements 308. Note that while the term "tape bearing surface" appears to imply that the surface facing the tape 315 is in physical contact with the tape bearing surface, this is not necessarily the case. Rather, it is more typical that a portion of the tape is in contact with the tape bearing surface, constantly or intermittently, and other portions of the tape ride above the tape bearing surface on a layer of air, sometimes referred to as an "air bearing".

As shown, each outrigger 302 has a flat tape bearing surface 314 that induces a small spacing between a tape 315 passing thereover and its tape bearing surface 314. When the tape 315 moves across the head, air is skived from below the tape 315 by a skiving edge 318, and instead of the tape 315 lifting from the tape bearing surface 314 of the module (as intuitively it should), the reduced air pressure in the area between the tape 315 and the tape bearing surface 314 allows atmospheric pressure to urge the tape towards the tape bearing surface 314. The outrigger 302 is positioned below the plane 317 of the tape bearing surface 312 adjacent the elements 308, thereby creating the proper wrap angle $\alpha_o$ of the tape 315 relative to the tape bearing surface 312 adjacent the elements 308.

Figure 20:
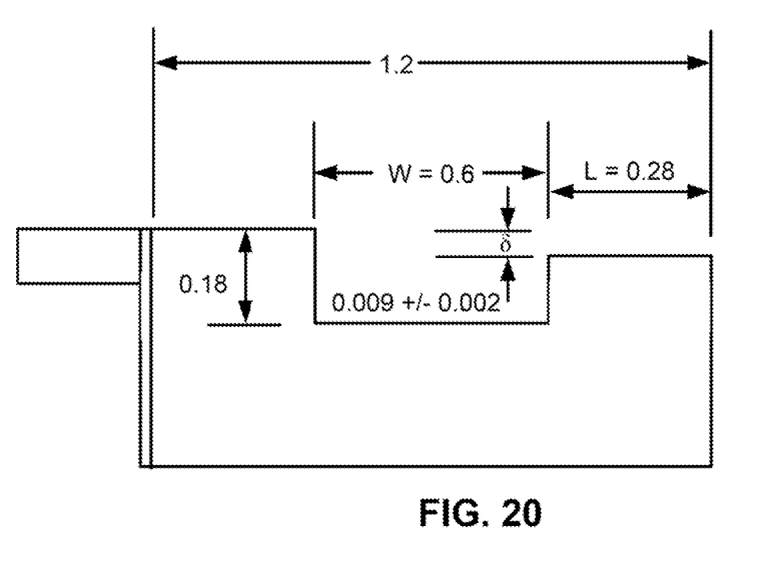
FIG. 20 is a side view of a module with an integrated outrigger.

In this embodiment, the tape bearing surfaces 312, 314 lie on parallel planes 317, 319, but are offset in a direction perpendicular to the planes 317, 319. Where the tape bearing surfaces 312, 314 lie along parallel yet offset planes, intuitively, the tape should peel off of the tape bearing surface 314 of the outrigger 302. However, the vacuum created by the skiving edge 318 of the outrigger 302 has been found by experimentation to be sufficient to keep the tape adhered to the tape bearing surface 314 of the outrigger 302. The trailing end 320 of the outrigger 302 (the end from which the tape leaves the outrigger 302) is the reference point which defines the wrap angle $\alpha_o$ over the tape bearing surface 312 adjacent the elements 308. Thus, the outer wrap angle $\alpha_o$ is approximately $\tan^{-1}(\delta/W)$ where $\delta$ is the height difference between the planes and W is the width of the slot as shown in FIG. 20.

An interesting characteristic of this and the next embodiment is that the tape does not tack down on the trailing outrigger. This in turn reduces wear on the trailing outrigger. A further benefit of this embodiment is that, because the outrigger 302 is formed directly on the substrate, the outer wrap angle $\alpha_o$ can be cut by machining surface 314 (just as the inner wrap angles $\alpha_i$ are fixed when the modules 304 are coupled together).

Figure 4:
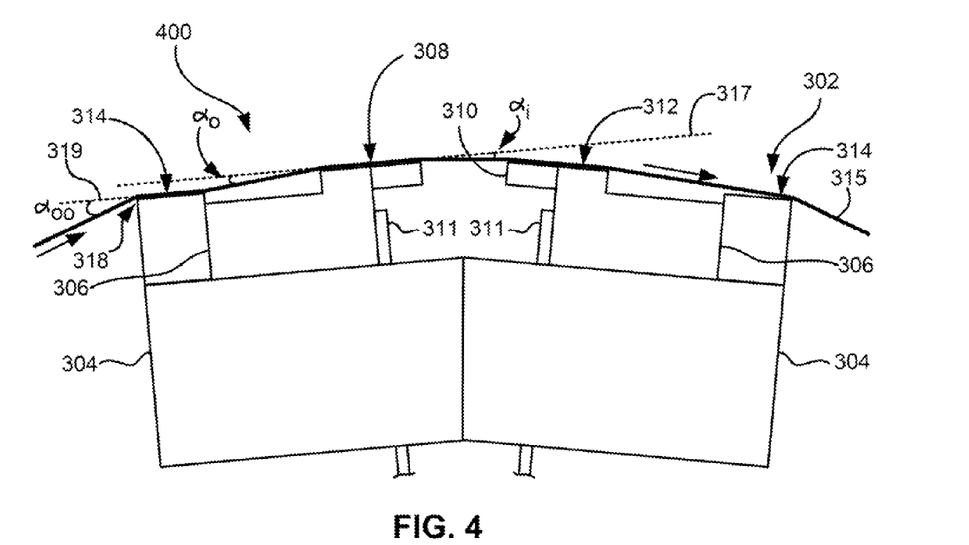
FIG. 4 is a side view of a magnetic tape head with outriggers formed as separate pieces and coupled of the substrate according to one embodiment.

While the outrigger 302 is preferably integrally formed on the module 304, alternatively, the outrigger 302 can be a separate piece mounted to the module 304, not directly coupled to the module 304 but held in position relative thereto by mounting hardware in the drive, etc. FIG. 4 illustrates an embodiment 400 where the outrigger 302 is formed from a separate piece adhesively coupled to the substrate. The outrigger 302 shown in FIG. 4 is directly coupled to the module 304, and can be formed of a material similar to or the same as the substrate 306. Any suitable coupling mechanism can be implemented to couple the outrigger 302 to the module 304, including but not limited to adhesives, screws, clamps, etc.

Figure 5:
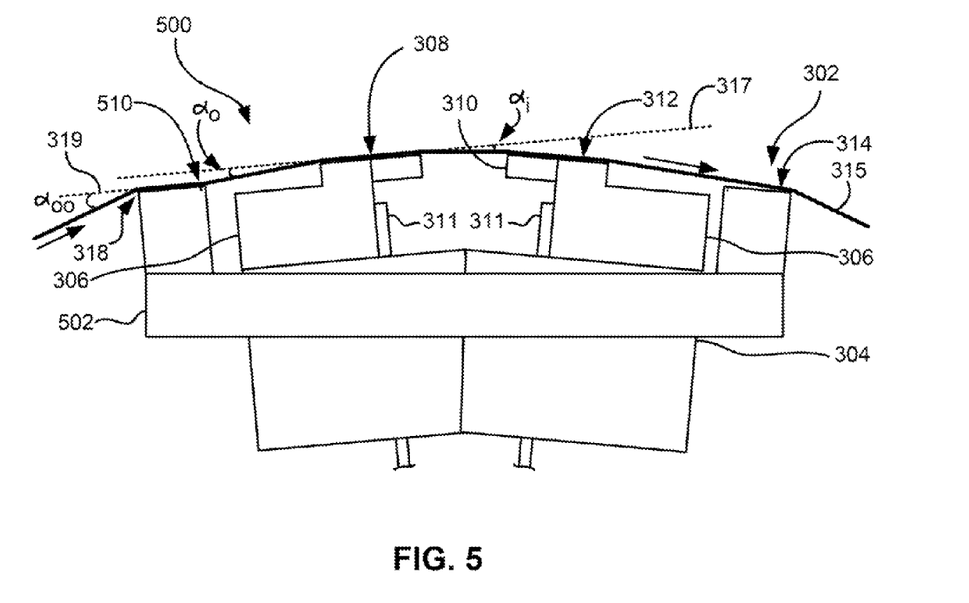
FIG. 5 is a side view of a magnetic tape head with outriggers not coupled directly to the substrate according to one embodiment.

FIG. 5 illustrates an embodiment 500 where the outrigger 302 is not mounted directly to the substrate 306, but is mounted to the same structure 502 to which each module 304 is coupled. As mentioned above, it is most preferable that the outrigger 302 is fixedly coupled in relation to the substrate, so that the outer wrap angles $\alpha_o$ remain fixed regardless of initial outer wrap angle $\alpha_{oo}$ of the tape approaching the outrigger 302.

In embodiments where the outrigger 302 has no elements, the initial wrap angle $\alpha_{oo}$ is less critical, and so greater tolerances are permitted. Particularly, tape wrap variations at the outer (skiving) edge 319 of the outrigger 302 do not change the internal wrap angle $\alpha_i$. A suggested initial wrap angle $\alpha_{oo}$ for the outrigger 302 is 0.6°±0.5° or 0.7°±0.5°, but can be as high as 2° or higher. The inventors have found that only a very slight wrap angle $\alpha_{oo}$ (e.g., 0.1°) need be present in order to create the desired tacking of the moving tape to the tape bearing surface 314. Wraps below 0.1 degrees have a higher risk of the tape popping off the outrigger 302, and wraps above 1.1 degrees may produce an undesirable stress level in the tape. In addition, the length of the tape bearing surface 314 in the direction of tape motion should preferably be longer than the tent length 202 (FIG. 2A) to ensure proper tack down of the tape.

With continued reference to FIG. 3, the initial wrap angle $\alpha_{oo}$ can be achieved by providing a datum in the head 300 assembly itself and then positioning the head 300 to datums in the drive. Alternatively, a locating fixture, consisting, for example, of a beam that straddles the guides on either side of the head 300 that has features for contacting the outrigger surfaces, may be used. Another technique is determining the wrap angles on the outriggers 302 via a laser beam. Another method would be to use adjustable rollers in conjunction with a laser or a fixture to set the wrap angle $\alpha_{oo}$ (still not using tape signals). Additionally, for compatibility the head 300 can be used in drives already having signal-based wrap.

In some embodiments, the outrigger 302 may itself include supplemental read and/or write elements 510, as shown in FIG. 5. Examples of supplemental writing include erase writing, servo writing, etc. For such applications, control of the initial wrap angle $\alpha_{oo}$ is less critical. An example of supplemental reading is reading the tape prior to writing and/or primary readback. One skilled in the art will appreciate that only the leading outrigger 302 may provide these functions, as the tape will not adhere to the trailing outrigger 302 (if present) until the tape direction is reversed.

The remaining discussion will assume that no elements are present on the outrigger 302, though one skilled in the art will appreciate that additional elements can be added to the outrigger(s) 302 of the following embodiments in a manner similar to that described above.

The tape bearing surface of the outrigger need not necessarily be parallel to and below the plane of the tape bearing surface adjacent to the elements, but can be offset angularly as well as spatially. In the embodiment 600 shown in FIG. 6, the outrigger 302 has a tape bearing surface 314 that is parallel to the tape at the desired wrap angle $\alpha_o$ relative to the tape bearing surface 312 adjacent to the elements 308.

Figure 7:
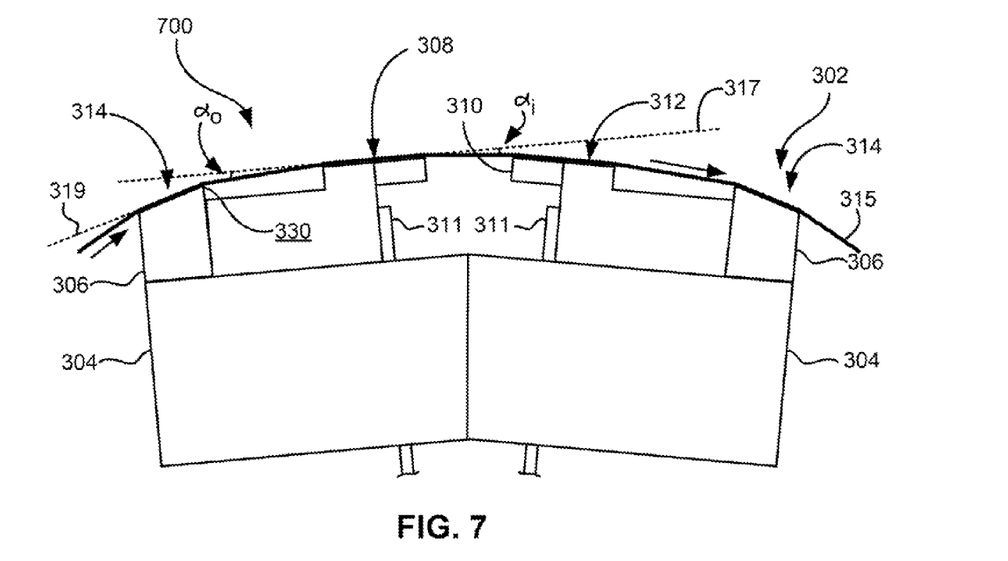
FIG. 7 is a side view of a magnetic tape head having an outrigger with a tape bearing surface that is angled relative to the tape bearing surface adjacent the elements, such that an overwrap is created.

FIG. 7 illustrates a further embodiment, where the outrigger 302 has a tape bearing surface 314 that is angled relative to the tape bearing surface 312 adjacent to the elements 308 by greater than the desired wrap angle $\alpha_o$ of a tape relative to the tape bearing surface 312 adjacent the elements 308. This orientation of the tape bearing surfaces 312, 314 is generally referred to as an overwrap configuration, because the tape "wraps over" the trailing edge 330 of the outrigger 302.

Figure 6:
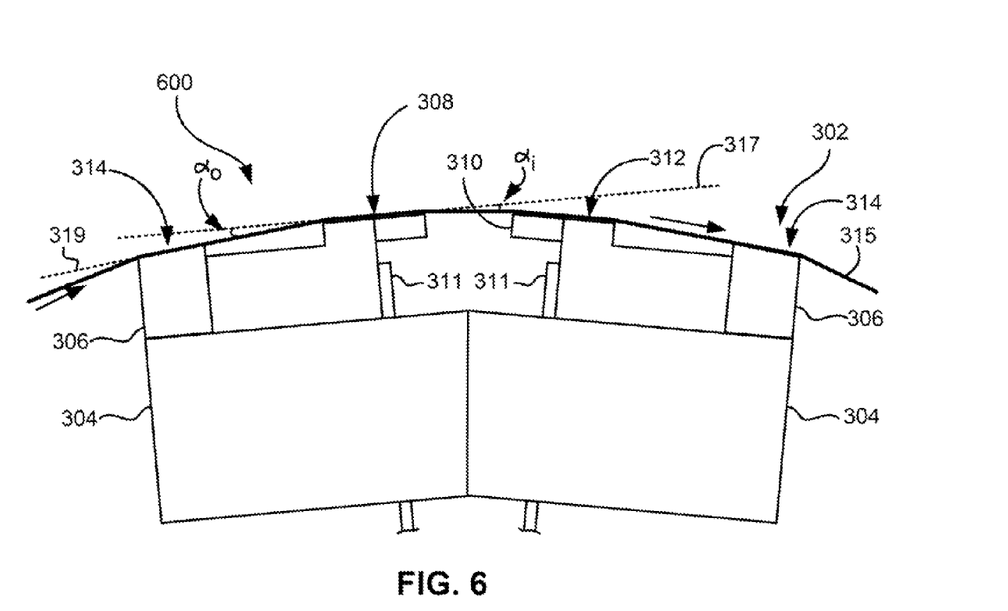
FIG. 6 is a side view of a magnetic tape head having an outrigger with a tape bearing surface that is generally aligned with a tape set at a preferred wrap angle relative to the tape bearing surface adjacent the elements.

In the embodiments shown in FIGS. 6 and 7, the outrigger 302 is preferably not formed integrally on the substrate, as the inventors have found that though the general shape is relatively easy to form on the substrate, setting the offset of the trailing edge of the tape bearing surface 314 of the outrigger 302 relative to the tape bearing surface 312 adjacent the elements 308 is very difficult to achieve. Particularly, the error in the offset distance is greater than tolerances allow. Due to the difficulties encountered when attempting to form such embodiments as an integral portion of the substrate 306, these embodiments are preferably formed of a separate outrigger 302 that is mounted to the substrate 306, overall module 304, or head 300.

One advantage provided by the embodiments of FIGS. 6 and 7 is that the internal wrap angle $\alpha_o$ of a tape relative to the tape bearing surface adjacent the elements on a particular module is defined by the outrigger. An additional advantage of the embodiments of FIGS. 6 and 7 is that the initial wrap angle of the tape approaching the leading outrigger is less critical, as adherence of the tape to the outrigger tape bearing surface is not required.

To create the outrigger as an integral portion of the module, as in the embodiment shown in FIG. 3, the module is generally formed as in a typical fabrication process but with some additional steps, as set forth below. According to one preferred method for forming the head, a wafer containing multiple "chips" each having read and/or write transducers (elements) is formed by traditional thin film processing. The thin film wafer is cut into rectangular sections, sometimes called quads. A thin film wafer can be any type of composite or composition capable of containing devices therein, but should be hard and capable of supporting the tape without exhibiting excessive wear.

Figure 8:
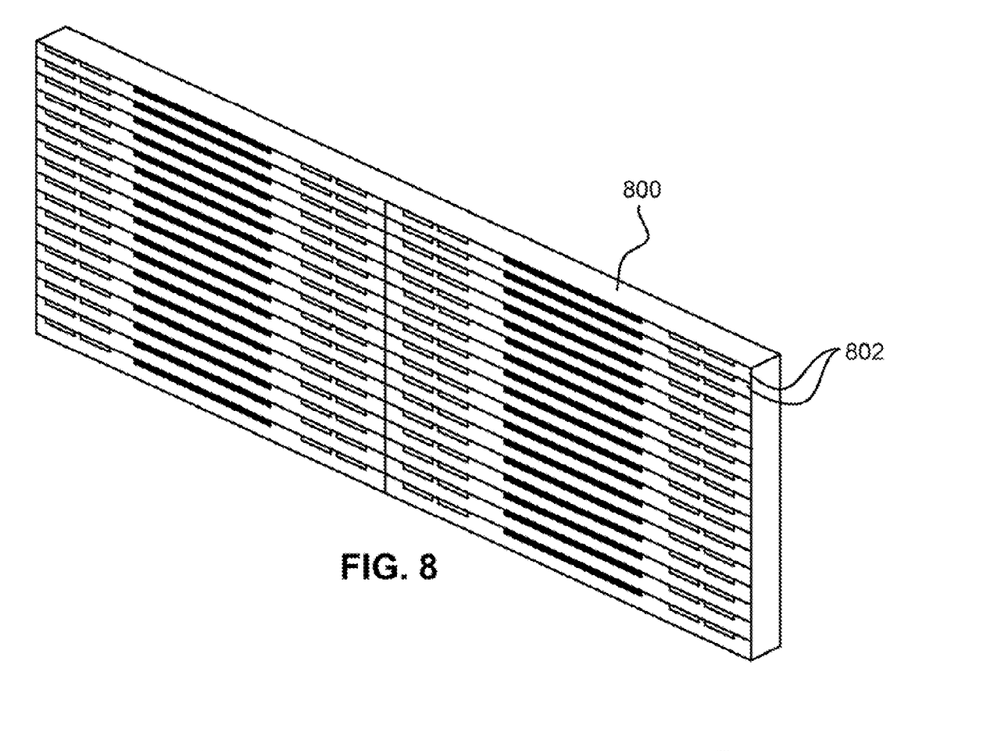
FIG. 8 is a perspective view of a section of a thin film wafer according to one embodiment.

FIG. 8 illustrates a section 800 of a thin film wafer according to one embodiment. As shown, the section 800 includes a plurality of rows 802 of devices that will eventually be sliced and diced to form a head or die. Each row 802 may contain multiple head images. Thus, while each row contains two head images in this figure, rows may generally have six or more head images.

Figure 9:
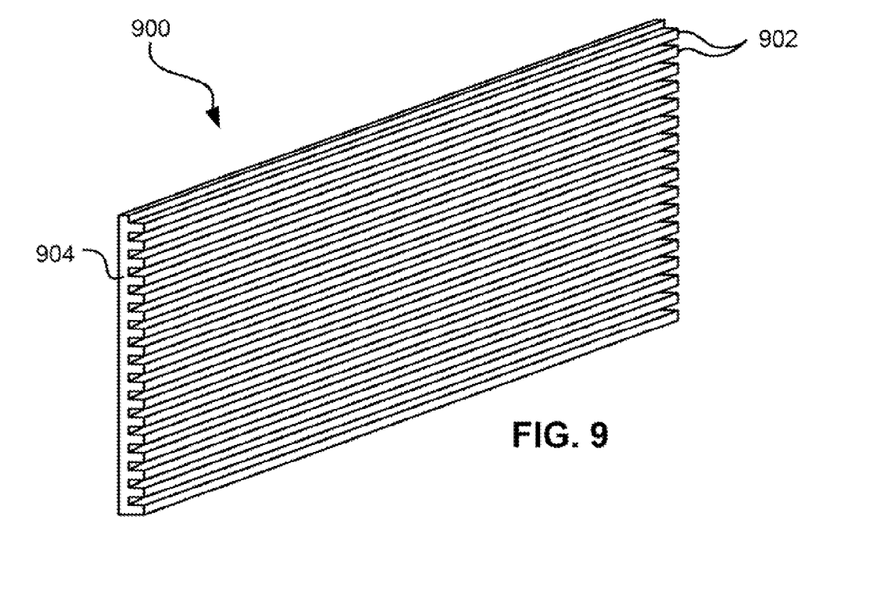
FIG. 9 is a perspective view of an array of closures.
Figure 10:
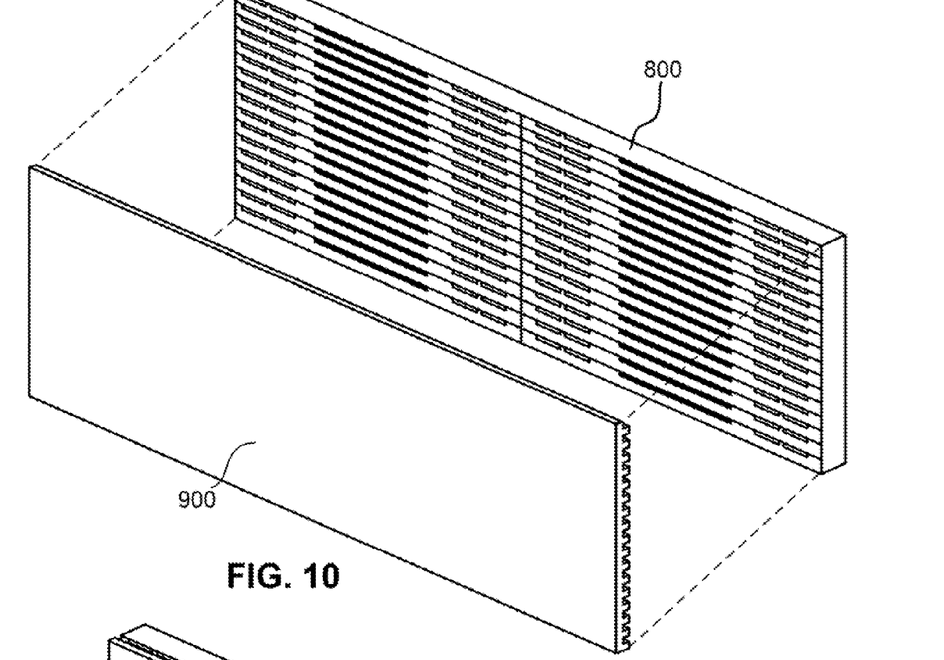
FIG. 10 is a perspective view depicting coupling of the array of closures to the section of wafer.

FIG. 9 shows an array 900 of closures 902 that will be bonded to a section 800 of the wafer. FIG. 10 illustrates how the array 900 is bonded to a section 800.

Figure 11:
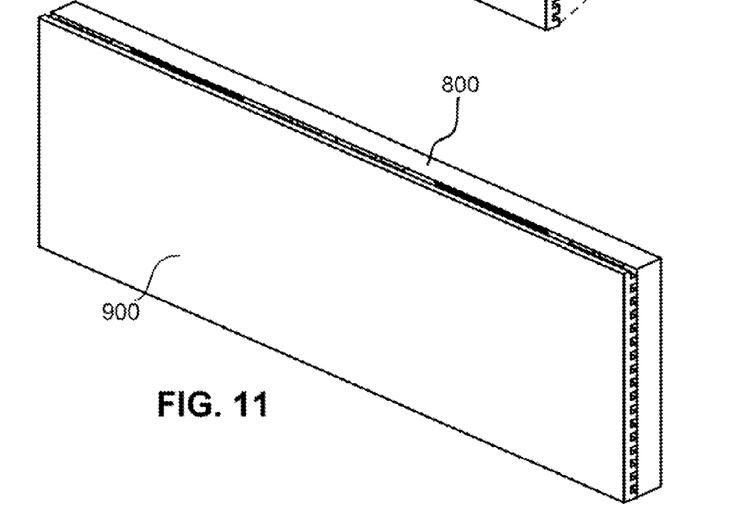
FIG. 11 is a perspective view of the array of closures coupled to the section of wafer.
Figure 12:
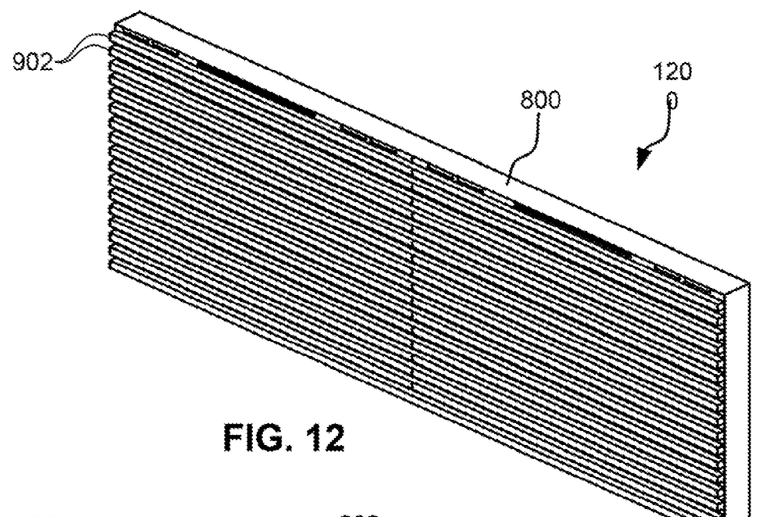
FIG. 12 is a perspective view of the closures coupled to the section of wafer upon removing a top portion of the array.

FIG. 11 depicts the array 900 of closures 902 bonded to the section 800 of wafer. A top portion 904 (FIG. 9) of the array 900 of closures 902 may be removed prior to slicing the section 800 into rows 802. Grinding may be used to remove the top portion 904 of the array 900. FIG. 12 shows the closure 902 and section 800 with the top portion of the array 900 of closures 902 removed. The portions of the closure 902 remaining after processing support the tape as the tape passes over the head to protect the delicate devices in the head from wear, similar to the way the tape 315 engages the head 300 shown in FIG. 3. Next, the row on the end of the quad 1200 may be lapped to give the final tape bearing surface.

Figures 13, 14:
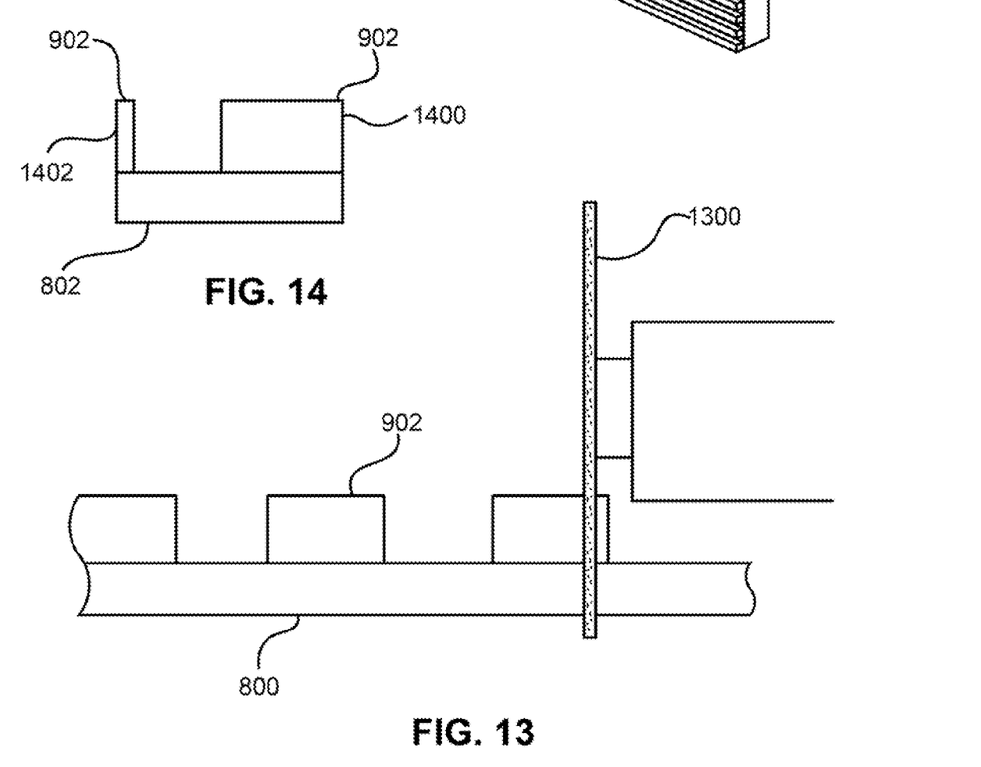
FIG. 13 is a side view depicting cutting of a row from a section of wafer.
FIG. 14 is a side view of a row cut from a wafer.

As shown in FIG. 13, a blade 1300 is used to slice rows from each section 800 by cutting through the closure 902 and section 800 such that opposite sides of the blade 1300 engage an equal surface area of the closure 902. In other words, the blade 1300 fully engages the closure 902. This in turn helps keep the blade 1300 straight during cutting, as equal forces exist on either side of the blade 1300.

FIG. 14 illustrates a row sliced from the section 800. Upon slicing, two pieces of closure material may remain coupled to the row. One portion 1400 of the closure material is desired and will function to engage the tape when the row is placed in a tape head. The other portion 1402 of the closure material, referred to as a sliver 1402, is removed.

Figures 15, 15A, 16, 17:
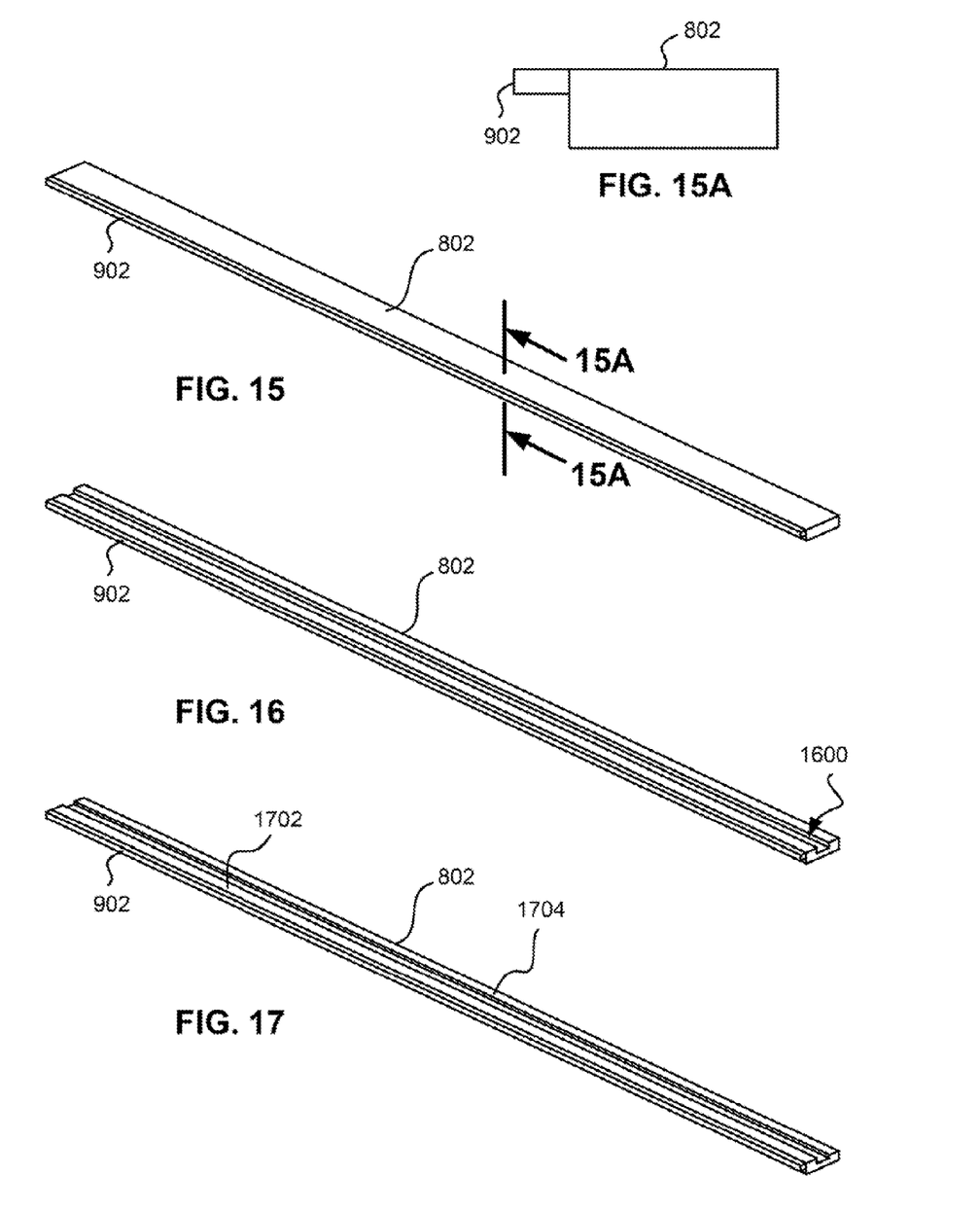
FIG. 15 is a perspective view of a row cut from a wafer.
FIG. 15A is a cross sectional view of the row of FIG. 15 taken along Line 15A-15A of FIG. 15.
FIG. 16 is a perspective view of a row with a trench cut therein.
FIG. 17 is a perspective view of a row with an outrigger formed thereon.

FIGS. 15 and 15A show a row after the sliver 1402 is removed. As shown in FIG. 16, a slot 1600 is formed in the row such as by grinding, sawing, laser cutting, etc. The slot 1600 gives the row a generally U-shaped profile at this point in the process.

Next, as shown in FIG. 17, the outrigger portion 1704 of the row is ground with a precision grinder. One type of grinder includes an optical or mechanical sensor that detects a first surface 1702 (such as the tape bearing surface of the module adjacent the elements) and, using that surface 1702 as a reference, grinds another surface 1704 to a desired offset from the reference, preferably to within 1-2 microns of the target depth. Such grinders are available from Toshiba and Cranfield Engineering.

Figure 18:
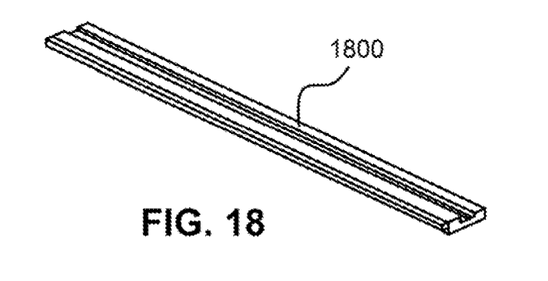
FIG. 18 is a perspective view of a die cut from a row.
Figure 19:
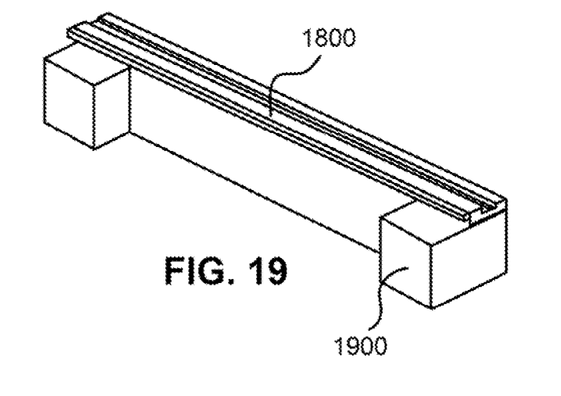
FIG. 19 is a perspective view of a die coupled to a U-beam.

The rows are then diced into individual thin film chips, or dies 1800, using traditional methods. See FIG. 18, which illustrates one die 1800. Each die 1800 is coupled to a U-beam 1900, as shown in FIG. 19. The U-beams 1900 are eventually coupled together to form a head.

An illustrative thickness of the wafer perpendicular to its face is about 1.2 mm. Another illustrative thickness of the wafer is about 2 mm. An illustrative width W of the slot is between about 0.3 mm and about 1 mm, though 0.6 mm and above is generally preferred. The tape bearing surface of the outrigger is positioned below the plane of the tape bearing surface of the substrate adjacent the elements. The distance $\delta$ between the planes of the tape bearing surfaces will depend on the slot width and desired wrap angle. A general range is about 0.004 to about 0.014 mm between the planes of the tape bearing surfaces. The depth of the slot is sufficient to allow escape of air from the skiving edge of the substrate positioned adjacent the elements. In general, the slot will be deeper than the tape bearing surface of the outrigger. An illustrative depth of the slot as measured from the tape bearing surface of the substrate adjacent the elements is about 0.009 mm to about 0.25 mm. Taken another way, an illustrative depth of the slot as measured from the tape bearing surface of the outrigger is about 0.001 mm to about 0.24 mm. An illustrative width L of the outrigger is about 0.28 mm, but in general should be greater than about the width of the tent (202 in FIG. 2A) of the tape to allow sufficient tack down length.

In one embodiment, the desired wrap angle of the tape relative to the tape bearing surface of the substrate adjacent the elements is about 0.9°±0.1°. FIG. 20 sets forth several illustrative dimensions of a module 304 according to an exemplary embodiment. The width of the wafer (substrate 306) is about 1.2 mm. The width of the slot 1600 is about 0.6 mm. This width is suggested as it tends to provide a good balance between obtaining the proper wrap angles, liftoff tendency on the outrigger 302, and tape stiffness effects. The width of the outrigger is about 0.28 mm. A depth of the slot is about 0.18 mm as measured from the tape bearing surface 312 adjacent the elements 308. The tape bearing surface 314 of the outrigger is about 0.009±0.002 mm below the plane of the tape bearing surface 312 adjacent the elements 308.

One skilled in the art will appreciate that the dimensions given above and other places herein are presented by way of example only and can be made larger or smaller per the design and fabrication constraints, performance considerations, etc.

In other embodiments, where the outrigger is not integral to the substrate, the head can be created in a conventional manner, with the additional step of adhering the outrigger to the substrate or mounting the outrigger to the head so that it is held in fixed relation to the module. These steps may be automated or performed by human labor.

Figure 21:
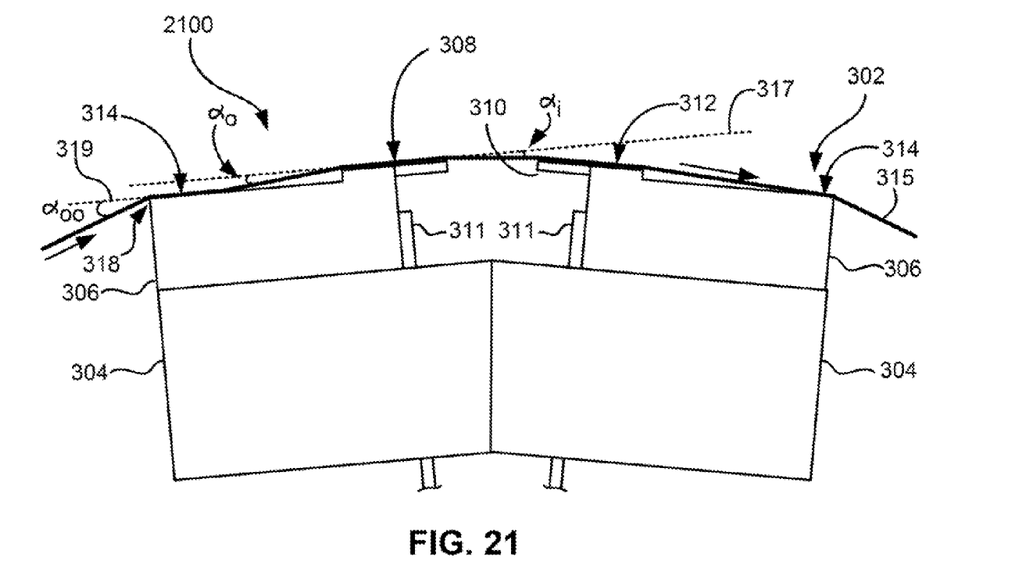
FIG. 21 is a side view of a magnetic tape head with outriggers having elongated tape bearing surfaces according to one embodiment.

FIG. 21 depicts a further embodiment 2100 where the second tape bearing surface 314 is offset from the first tape bearing surface 312 as in the embodiments of FIGS. 3 and 4 above, but no slot or gap is formed between the first and second tape bearing surfaces. In this embodiment, the height difference between the planes is smaller and may be, e.g., about 0.002 to about 0.004 mm.

Any of the above embodiments or combinations of portions thereof can also be applied to any type of magnetic heads and magnetic recording systems, both known and yet to be invented. For example, the teachings herein are easily adaptable to interleaved heads, which typically include opposing modules each having an array of alternating readers and writers configured to provide read-while-write capability.

Figure 22:
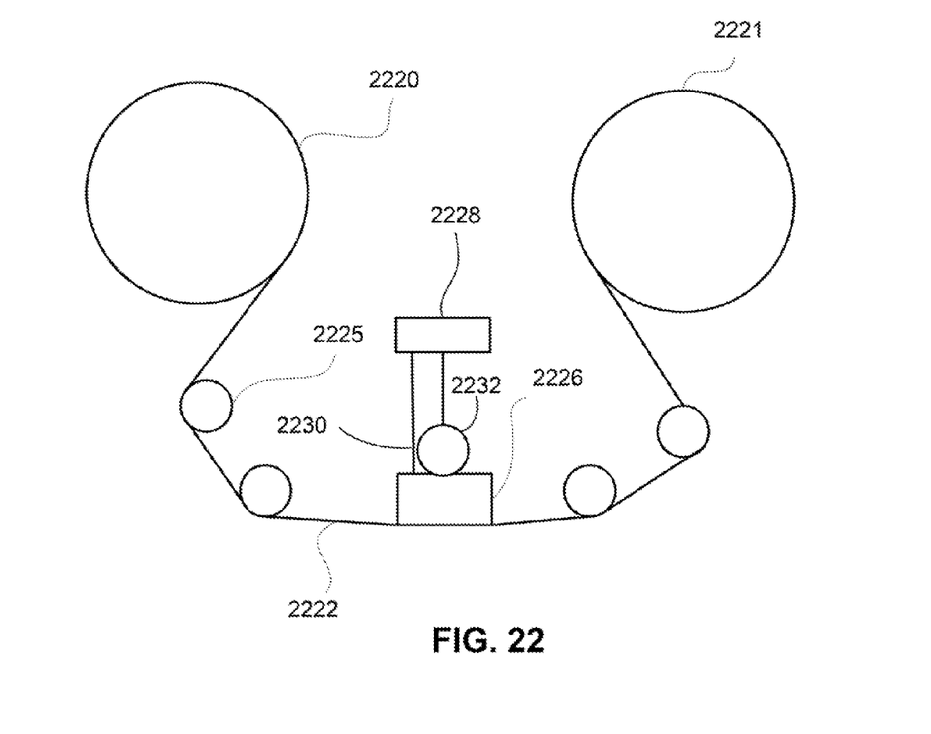
FIG. 22 is a schematic diagram of the tape drive system.

FIG. 22 illustrates a simplified tape drive which may be employed in the context of the present invention. While one specific implementation of a tape drive is shown in FIG. 22, it should be noted that the embodiments of the previous figures may be implemented in the context of any type of tape drive system.

As shown, a tape supply cartridge 2220 and a take-up reel 2221 are provided to support a tape 2222. These may form part of a removable cassette and are not necessarily part of the system. Guides 2225 guide the tape 2222 across a preferably bidirectional tape head 2226, of the type disclosed herein. Such tape head 2226 is in turn coupled to a controller assembly 2228 via an MR connector cable 2230. The controller 2228, in turn, controls head functions such as servo following, write bursts, read functions, etc. An actuator 2232 controls position of the head 2226 relative to the tape 2222.

A tape drive, such as that illustrated in FIG. 22, includes drive motor(s) to drive the tape supply cartridge 2220 and the take-up reel 2221 to move the tape 2222 linearly over the head 2226. The tape drive also includes a read/write channel to transmit data to the head 2226 to be recorded on the tape 2222 and to receive data read by the head 2226 from the tape 2222. An interface is also provided for communication between the tape drive and a host (integral or external) to send and receive the data and for controlling the operation of the tape drive and communicating the status of the tape drive to the host, all as will be understood by those of skill in the art.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head, comprising:
   a substrate having a tape bearing surface;
   a plurality of elements coupled to the substrate and positioned towards the substrate tape bearing surface, the elements being selected from a group consisting of readers, writers, and combinations thereof; and
   an outrigger held in a fixed position relative to the substrate, the outrigger having a tape bearing surface;
   wherein the outrigger tape bearing surface and the substrate tape bearing surface lie along planes, the planes being offset from one another;
   wherein the outrigger tape bearing surface lies along a single plane,
   wherein the outrigger tape bearing surface is angled from the substrate tape bearing surface by greater than a wrap angle of a tape relative to the substrate tape bearing surface.

2. A magnetic head, comprising:
   two modules coupled together in opposing relation, each module comprising:
     a substrate having a tape bearing surface; and
     a plurality of elements coupled to the substrate and positioned towards the tape bearing surface, the elements being selected from a group consisting of readers, writers, and combinations thereof,
     wherein the tape bearing surfaces of the modules are angled relative to each other for defining an internal wrap angle of the modules; and
   two outriggers positioned on opposite sides of the modules, each outrigger being held in a fixed position relative to the module closest thereto, each outrigger having a tape bearing surface;
   wherein the tape bearing surface of each outrigger and the tape bearing surface of the substrate positioned closest thereto lie along planes being offset from one another;
   wherein the tape bearing surface of each outrigger lies along a single plane,
   wherein the tape bearing surface of each outrigger is angled from the tape bearing surface of the substrate closest thereto by greater than a wrap angle of a tape relative to the substrate tape bearing surface.

* * * * *